Oct. 30, 1951  R. R. STEANS  2,572,960
BUTTER FORMING DEVICE
Filed Nov. 4, 1946
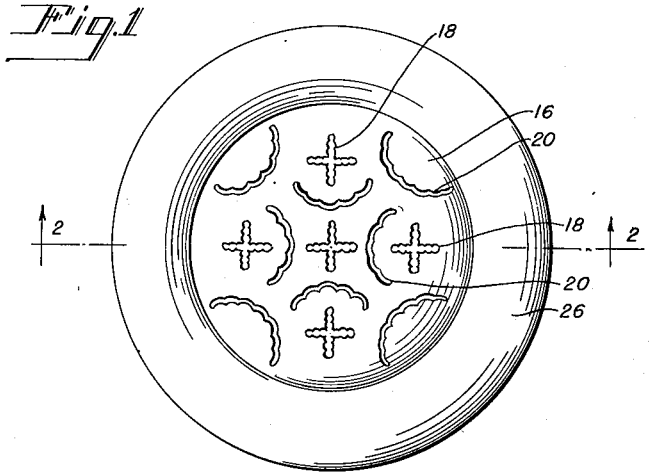
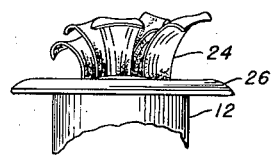
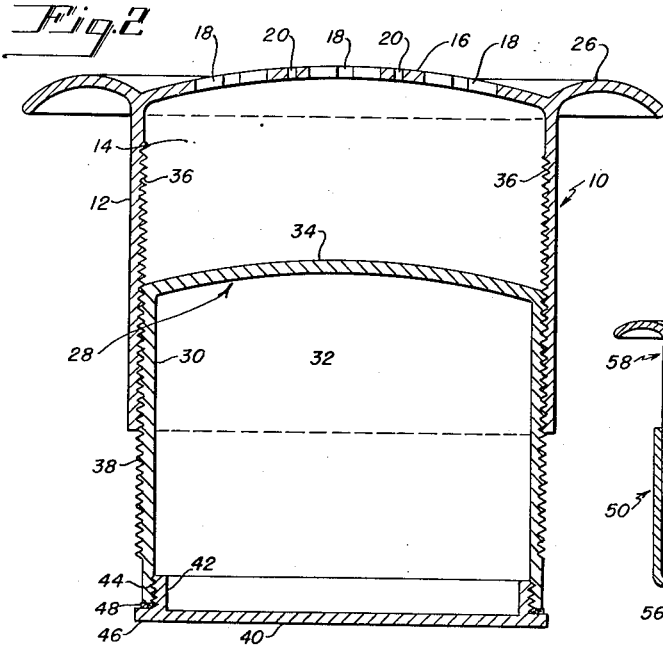
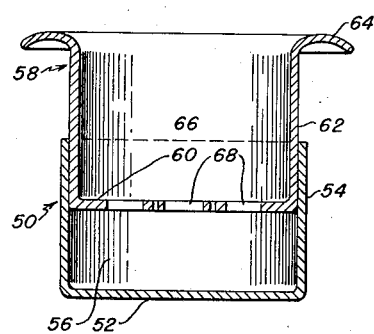
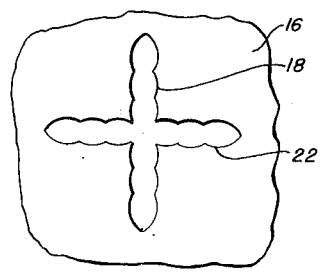
INVENTOR.
RIA ROSITA STEANS
BY
ATTORNEY Patented Oct. 30, 1951

2,572,960

UNITED STATES PATENT OFFICE 2,572,960

BUTTER FORMING DEVICE

Ria Rosita Steans, New York, N. Y.

Application November 4, 1946, Serial No. 707,724

2 Claims. (Cl. 31—12)

This invention relates to devices for forming and serving butter.

An object of the invention is to provide a device for forming butter into ornamental designs and shapes such as, for example, flower designs and in which these formed shapes it may be served, thus enhancing the appetites of the users thereof.

Another object of the invention is to provide a butter forming device which includes a receptacle for the reception of butter, and which has means whereby the butter in the receptacle may be extruded in various ornamental designs and shapes.

A further object of the invention is to provide a butter shaping and forming device which includes a butter chamber, ornamentally shaped die apertures in the butter chamber, and means for forcing the butter through the die apertures to form the butter into appetizing shapes.

Still another object of the invention is to provide a butter shaping and forming device which includes a butter chamber having die apertures formed therein for extruding butter in predetermined shapes therethrough, and which is also provided with an ice storage chamber for cooling the butter in the butter chamber and maintaining it in hardened condition.

Other objects and advantages of my invention will become apparent from the following description of a preferred embodiment thereof as illustrated in the accompanying drawings, and in which, Fig. 1 is a top plan view of my improved butter former and shaper;

Fig. 2 is a cross-sectional view taken on line 2—2 of Fig. 1;

Fig. 3 is a fragmentary enlarged plan view of one of the die apertures shown in Fig. 1;

Fig. 4 is a fragmentary sectional elevation view of the device shown in Fig. 2, but of reduced size and showing the extruded butter shapes; and Fig. 5 is a cross-sectional view similar to Fig. 2 but of reduced size and illustrating a modified form of the invention.

In order to understand the nature of the invention and the means for carrying it out, reference may now be had to the drawings, in which like reference characters denote similar parts throughout the several views. As shown, there is provided an upper casing 10 having a cylindrical side wall 12 defining a hollow butter chamber 14 closed at the top by means of an upwardly arched or curved top member 16. The top member 16 is preferably formed integral with the side walls 12, and is provided with a number of die apertures 18 and 20, as best shown in Figs. 1 and 3.

The die apertures 18 may be of any desired shape to produce any attractive designs, such as, for example the generally cross-shaped design when viewed in plan in Fig. 1, the edges 22 of the apertures being serrated or scalloped as shown in Fig. 3, to enhance the ornamental appearance of butter forms 24 which are extruded upwards therethrough as shown in Fig. 4. The die apertures 20 may have their edges similarly scalloped for the same purpose. The upper casing 10 is provided with an integral annular outstanding flange 26 extending from the perimeter of the top member 16, and curved when seen in cross section as shown in Fig. 2. The flange 26 facilitates the manual handling of the butter former, and also serves as a rim to prevent dropping of butter upon the table.

A hollow lower housing 28 has a cylindrical side wall 30 defining a lower chamber 32 which is closed at the top by means of top member upwardly arched to correspond to the curvature of the top member 16 of the upper casing 10. The outside diameter of the lower housing is slightly less than the inside diameter of the upper housing to permit the two housings to telescope as shown, with the lower housing extending upwards inside the butter receiving chamber 14. If desired the inner wall surface of the upper housing may be threaded at 36 to engage with matching outside threads 38 which are formed on the outer surface of the walls 30 of the lower housing, thus permitting the lower housing, acting as a movable piston, to be threadedly retracted upwardly inside the upper housing to compress the butter stored in chamber 14.

When this is done, the effect is to force the butter upwards, extruding it through the ornamentally shaped die apertures 18 and 20 so as to form corresponding butter extrusions 24 as shown in Fig. 4. The configuration of the die apertures may be varied as desired, to appropriately change the shape of the butter extrusions, many flower-like and other attractive designs being possible. If extruded far enough, the butter shapes may lean or curve outward to simulate leafy formation.

The lower casing chamber 32 is so designed that it may be employed for the storage of ice cubes, thus maintaining the butter in the upper chamber 14 cold and relatively hard. The bottom of the ice chamber 32 is closed by means of a lower base member 40 having an externally threaded upstanding skirt 42 for engagement with the correspondingly internally threaded inner surface portion 44 of the lower casing, the base 40 having a flange 46 which abuts against a gasket 48 interposed between the flange and the lower end surface of the lower casing. The gasket thus aids in forming a tight seal therebetween, to prevent leakage of water from chamber 32 as the ice melts.

Fig. 5 shows a modified form of the invention. As illustrated, there is a lower cup shaped casing 50 having a circular base 52 surmounted by a cylindrical side wall 54 to define an upwardly open butter chamber 56. An upper casing 58 has a circular base 60 surmounted by cylindrical upper side walls 62 the upper edges of which are curved outwardly to form a flange or rim 64, the casing 58 thus defining an upwardly open chamber 66. The outside diameter of the side walls 62 of the upper casing is slightly less than the inside diameter of the side walls 54 of the lower casing, so as to permit the upper casing to telescope into the lower casing to compress butter placed in the butter chamber 56, under the influence of force applied upon the rim 64, by hand or otherwise.

The base 60 of the upper casing is provided with die apertures 68, which may be shaped somewhat like those illustrated at 18 and 20 in Fig. 1, the butter being forced upwards through the die apertures and into the upper chamber 66 in the upper casing, in attractive extruded shapes. The butter shapes in chamber 66, like those shown at 24 in Fig. 4, may be cut off with a knife or other utensil and used by or served to the diners, the process being repeated so long as butter remains in the butter chambers. The devices illustrated may be formed of any suitable material, such as sterling silver, other metals, or plastic materials.

As described in connection with the Fig. 5 form of invention, the upper and lower casings 10 and 28 of the Figs. 1 to 4 form may also be made without the threads 36 and 38 so that the said casings 10 and 28 may slidably telescope to extrude the butter.

Although I have described my invention in specific terms it is to be understood that various changes may be made in size, shape, materials and arrangement without departing from the spirit and scope of the invention as claimed.

I claim:

1. As an article of manufacture, a butter serving dish device for forming and serving butter into extruded shapes thereon, comprising an upper casing having cylindrical side walls defining a downwardly open chamber for the reception of butter, the upper top wall of said chamber having a plurality of attractively shaped butter extruding die apertures formed therein, an annular outstanding flange surmounting said cylindrical walls of the upper casing adjacent the said top wall thereof to form a rim, a lower casing having cylindrical side walls surmounted by a top member to define an ice storage chamber therein, a base member threaded into the lower end of said ice storage chamber for closing the same, said upper and lower casings being complementarily threaded whereby the lower casing may be telescopically received in the upper casing and threadedly engaged therewith, and whereby upon movement of said lower casing into said butter storage chamber the cooled butter is compressed thereby, forcing it out through said butter extruding die apertures to form attractive butter shapes supported upon the upper surface of the upper casing, from which they may be served.

2. As an article of manufacture, a butter serving dish for forming and at the same time serving butter thereon in extruded attractive shapes, comprising a main tubular casing having a chamber formed therein for the reception of a quantity of butter ready to serve, a serving wall closing off one end of said main casing, said wall having die apertures formed therein through which the butter may be forced to be extruded into attractive shapes, said wall being designed to act as a support for said extruded butter and so disposed as to be readily accessible to the diner at the table, said main tubular casing being provided with an outwardly extending flange to serve as a carrying finger grip member for said dish, a second tubular casing relatively nestably movable with respect to said main tubular casing, said second tubular casing having an imperforate wall closing off one end thereof, said last named wall being movable with said second tubular casing toward said die apertured wall of said main tubular casing and designed, upon such movement to force the butter in said chamber to be extruded through said die apertures, and a cover member removably mounted on said second tubular casing at the opposite end from said imperforate wall whereby to form a chamber for the reception of ice to maintain said butter in solid condition after it is extruded and when served.

RIA ROSITA STEANS.

REFERENCES CITED

The following references are of record in the file of this patent:

UNITED STATES PATENTS

| Number | Name | Date |
|---|---|---|
| 85,551 | Whipple | Jan. 5, 1869 |
| 1,429,635 | Ross | Sept. 19, 1922 |
| 2,085,446 | Philippe | June 29, 1937 |
| 2,104,642 | Greene | Jan. 4, 1938 |

FOREIGN PATENTS

| Number | Country | Date |
|---|---|---|
| 18,209 | Great Britain | Sept. 5, 1891 |
| 130,079 | Germany | May 23, 1901 |
| 15,599 | Great Britain | Dec. 31, 1910 |
| 521,537 | Great Britain | May 23, 1940 |